No. 641,069. Patented Jan. 9, 1900.
H. C. BOTHWELL.
CULTIVATOR.
(Application filed Aug. 23, 1899.)
(No Model.)
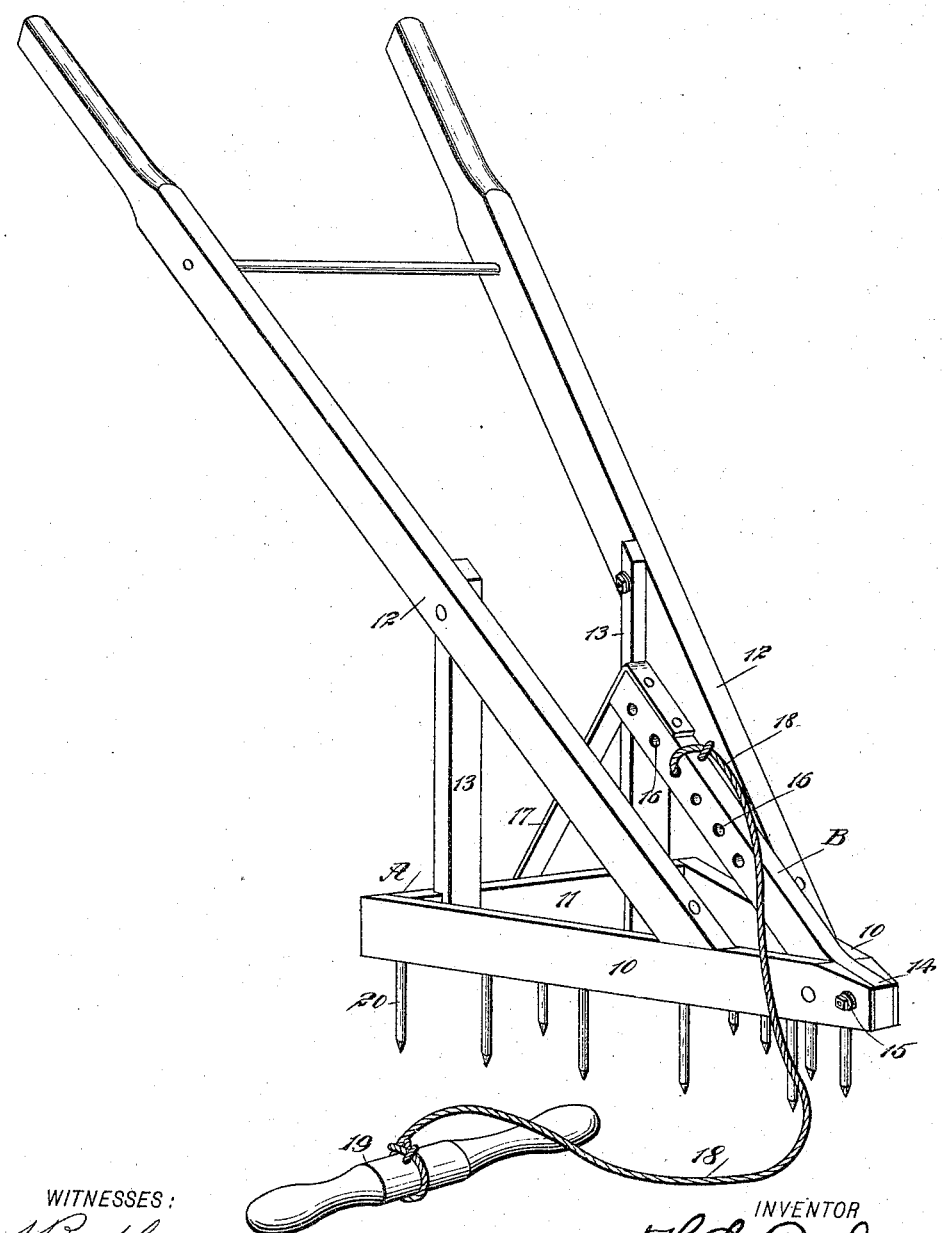
WITNESSES:
INVENTOR
BY
ATTORNEYS

UNITED STATES PATENT OFFICE.

HENRY CLAY BOTHWELL, OF McARTHUR, OHIO.

CULTIVATOR.

SPECIFICATION forming part of Letters Patent No. 641,069, dated January 9, 1900.

Application filed August 23, 1899. Serial No. 728,210. (No model.)

*To all whom it may concern:*

Be it known that I, HENRY CLAY BOTHWELL, of McArthur, in the county of Vinton and State of Ohio, have invented a new and Improved Cultivator, of which the following is a full, clear, and exact description.

My invention relates to cultivators, including that class of cultivators which are manually operated.

The object of the invention is to so arrange and apply the draft that a light implement especially may be more advantageously operated than heretofore.

The invention consists in the novel construction and combination of the several parts, as will be hereinafter fully set forth, and pointed out in the claims.

Reference is to be had to the accompanying drawing, forming a part of this specification, which represents a perspective view of the improved implement.

The body A of the cultivator is preferably of triangular form, as shown, comprising two side pieces 10, that converge at the front, and a back piece 11. Handles 12 are secured to the side pieces 10 and are supported ordinarily by braces 13, that extend upward from the back 11 of the body of the implement; but the handles may be otherwise applied, if desired.

The foot portion 14 of a draft-bar B is located between the converging ends of the side members 10 of the body of the implement. The said side members 10 of the frame of the implement are connected, and the foot 14 is secured between them by means of a suitable bolt 15 or equivalent fastening device. The draft-bar B rises gradually above the plane of the frame and is given a gradual rearward-and-upward inclination, and said draft-bar is provided with a series of apertures 16, longitudinally arranged, and the back of the draft-bar is usually supported by a brace 17, secured to the rear end of said draft-bar and to the rear member 11 of the frame of the implement.

As has been stated, the device is to be manually operated, and to that end a rope, chain, pole, or bar 18 is secured to the draft-bar at any one of its apertures 16, and, if desired, a removable clevis may be provided for the draft-rope 18 or its equivalent, which clevis is adapted to enter any one of the apertures 16. The clevis may be of the ordinary construction.

A cross or hand bar 19 is attached to the forward or outer end of the draft rope, chain, pole, or bar 18, as is illustrated in the drawing. The teeth 20 of the cultivator may be of any desired construction or shape. As shown in the drawing, the teeth are provided with spike-points, which points may be either circular or polygonal in cross-section, and the shanks or bodies of the teeth are of polygonal form. The teeth 20 are located along the bottom portion of the sides of the body of the implement, and one tooth is located at the center of the rear member 11 of the body, extending downwardly therefrom, although teeth may be placed all along the lower portion of the back member of the frame A, if so desired.

In operation, the power being applied as shown in the drawing and the resistance to be overcome at the points of the teeth being greater than the gravity of the implement at these points, the implement will have a tendency to rise at the rear and revolve forward on its front teeth. The operator overcomes this tendency to revolve by lightly bearing downward on the handles, thus inserting the teeth into the earth the required depth, and as the implement is drawn ahead the teeth will regularly and evenly act upon the soil and the draft will be exceedingly light.

The draft device employed is adjustable up or down the draft-bar B to accommodate the implement to hard or to loose soil. When the draft rope or chain is carried upward upon the draft-bar, the teeth of the implement will enter the ground deeply, and when the draft rope or chain 18 is connected with the draft-bar at its lower portion the teeth 20 will enter the ground only to a slight extent.

The draft on an implement of this character tends upward, the point of application usually being lower than the source of power, and in any event the draft normally has virtually a forward tendency. In my invention the upward and forward tendency is availed of and so directed as to cause the front end of the implement to act as a fulcrum upon which the implement will tend to rock forward. I further develop this principle of action by providing a series of points of draft of increasing vertical position in order to regulate the tendency to rock, and thereby regulate the depth of cultivation by varying the forwardly-rocking tendency through the upwardly-extending series of connecting-points and opposing or controlling this tendency by proper downward pressure on the handles, these operations being all tributary to the principal effect produced by the stated position and arrangement of the draft connections to produce other forwardly-rocking tendency.

Having thus described my invention, I claim as new and desire to secure by Letters Patent—

1. In an agricultural implement, a frame carrying cultivating devices, a draft, and means for securing said draft to the frame at increasing intervals above the frame and at increasing intervals rearward of the forward cultivating devices as and for the purpose set forth.

2. In an agricultural implement, a frame carrying cultivating devices, a draft-bar secured to said frame, a draft, and means for attaching said draft to points on said draft-bar at different intervals above said frame and at different intervals rearward of the front cultivating devices, as set forth.

3. In an agricultural implement, a frame carrying cultivating devices, a draft-bar secured to said frame and having points for a draft, said points extending rearwardly of the front cultivating devices and at an oblique angle to the face of the frame, and a draft adapted to be secured to said draft-bar, as set forth.

4. In an agricultural implement, a base, a draft-frame rising gradually beyond the plane of the said base, having an upward and rearward inclination and provided with a series of longitudinally-arranged apertures, the forward end of the draft-bar being secured to the forward central portion of the base, the said draft-bar from a point just above the frame to its rear end being longitudinally straight, and means for supporting the rear end of said draft-bar, as specified.

In testimony whereof I have signed my name to this specification in the presence of two subscribing witnesses.

HENRY CLAY BOTHWELL.

Witnesses:
C. FRED WILL,
MELTON L. PEARCE.